US007169054B2

(12) United States Patent
Suzuki et al.

(10) Patent No.: US 7,169,054 B2
(45) Date of Patent: Jan. 30, 2007

(54) TORQUE FLUCTUATION ABSORBING APPARATUS HAVING STRUCTURE FOR REDUCING MISALIGNMENT OF TORQUE LIMITER DURING ASSEMBLING THEREOF, AND METHOD FOR ASSEMBLING THE SAME

(75) Inventors: Haruhisa Suzuki, Susono (JP);
Masahiro Kojima, Susono (JP);
Hiroshi Hata, Susono (JP); Masatoshi Adachi, Susono (JP); Tomohiro Saeki, Anjo (JP); Mototaka Nakane, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/257,080

(22) Filed: Oct. 25, 2005

(65) Prior Publication Data
US 2006/0040749 A1 Feb. 23, 2006

Related U.S. Application Data

(62) Division of application No. 10/428,985, filed on May 5, 2003, now Pat. No. 6,976,920, which is a division of application No. 09/910,734, filed on Jul. 24, 2001, now Pat. No. 6,582,312.

(30) Foreign Application Priority Data
Jul. 27, 2000 (JP) ............................. 2000-226654

(51) Int. Cl.
*F16D 7/02* (2006.01)
(52) U.S. Cl. ..................................................... 464/46
(58) Field of Classification Search .............. 464/45, 464/46
See application file for complete search history.

(56) References Cited

U.S. PATENT DOCUMENTS
3,323,328 A 6/1967 Montgomery
(Continued)

FOREIGN PATENT DOCUMENTS
DE G 8525600.5 4/1993
(Continued)

OTHER PUBLICATIONS
PRIUS New Car Feature, p. 80, Apr. 5, 2000.

*Primary Examiner*—Greg Binda
(74) *Attorney, Agent, or Firm*—Pillsbury Winthrop Shaw Pittman LLP

(57) ABSTRACT

A torque fluctuation absorbing apparatus provided between a crankshaft of an engine and a driven-side input shaft includes a flywheel coupled to the crankshaft and a damper assembly disposed in a torque transmission path between the flywheel and the driven-side input shaft. The damper assembly includes a pair of drive plates, a driven plate and a spring damper. A torque limiter is disposed in a torque transmission path between the flywheel and the damper assembly. The torque limiter includes a pair of linings which generates relative rotational slip between the flywheel and the damper assembly when a torque larger than a predetermined amount is transmitted and are adapted to slip when receiving at least a predetermined amount of torque. The linings of the torque limiter are fixed to one of the drive plates and are interposed between a flywheel main body and a damper cover that forms a part of the torque limiter. The drive plates, the linings and the damper cover are centered with respect to the flywheel main body, and are assembled together to provide an assembly of the flywheel main body, the damper assembly and the torque limiter. After the engine is assembled with the driven-side input shaft, the assembly of the flywheel main body, the damper assembly and the torque limiter is fastened to the flywheel plate that is fixed to the crankshaft.

1 Claim, 9 Drawing Sheets

U.S. PATENT DOCUMENTS

| | | |
|---|---|---|
| 4,724,719 A | 2/1988 | Werner et al. |
| 4,760,754 A | 8/1988 | Friedmann |
| 4,889,218 A | 12/1989 | Chasseguet et al. |
| 4,906,220 A | 3/1990 | Worner et al. |
| 4,947,700 A | 8/1990 | Kern et al. |
| 4,964,504 A | 10/1990 | Friedmann |
| 5,030,166 A | 7/1991 | Worner et al. |
| 5,156,249 A | 10/1992 | Friedmann |
| 5,176,233 A | 1/1993 | Woerner et al. |
| 5,246,398 A | 9/1993 | Birk et al. |
| 5,695,032 A * | 12/1997 | Murata et al. ............ 464/46 X |
| 5,935,008 A | 8/1999 | Mizukami |
| 6,582,312 B2 | 6/2003 | Suzuki et al. |
| 6,923,725 B2 * | 8/2005 | Takeuchi et al. |
| 2002/0046916 A1 | 4/2002 | Pienemann et al. |

FOREIGN PATENT DOCUMENTS

| | | |
|---|---|---|
| JP | 05280589 | 10/1993 |
| JP | 06081898 A | 3/1994 |
| JP | 2000002264 A | 1/2000 |

* cited by examiner

US 7,169,054 B2

TORQUE FLUCTUATION ABSORBING APPARATUS HAVING STRUCTURE FOR REDUCING MISALIGNMENT OF TORQUE LIMITER DURING ASSEMBLING THEREOF, AND METHOD FOR ASSEMBLING THE SAME

CROSS REFERENCE TO RELATED APPLICATIONS

This application is a Divisional of U.S. application Ser. No. 10/428,985, filed May 5, 2003, now U.S. Pat. No. 6,976,920, which was a Divisional of U.S. application Ser. No. 09/910,734, filed Jul. 24, 2001, now U.S. Pat. No. 6,582,312, which claimed priority to Japanese Patent Application 2000-226654 filed Jul. 27, 2000, the entire contents of all three applications being incorporated by reference herein in their entirety.

BACKGROUND OF THE INVENTION

1. Field of the Invention

The invention relates to a torque fluctuation absorbing apparatus having a structure for reducing misalignment of a torque limiter during assembling of the apparatus, and also relates to a method for assembling the torque fluctuation absorbing apparatus while reducing misalignment of the torque limiter when it is mounted in the apparatus.

2. Description of Related Art

A torque fluctuation absorbing apparatus is coupled to and between an engine crankshaft and an input shaft of a driven-side assembly (e.g., a transmission of a hybrid vehicle which houses a motor) so as to reduce engine torque fluctuations.

FIG. 8 and FIG. 9 show a known example of torque fluctuation absorbing apparatus. The torque fluctuation absorbing apparatus 1 includes a flywheel 10 coupled to a crankshaft 2 of an engine, a damper assembly 20 disposed in a torque transmission path between the flywheel 10 and a driven-side input shaft 3, and a torque limiter 30 disposed in a torque transmission path between the flywheel 10 and the damper assembly 20. The damper assembly 20 has a pair of drive plates 21, a driven plate 22, and spring dampers 24. The torque limiter 30 has a pair of linings 31 and a damper cover 32, and is adapted to slip when receiving a predetermined or larger amount of torque.

The pair of linings 31 are secured to both faces of an outer peripheral portion of one of the drive plates 21 (or a member fixed to the drive plate 21). The pair of linings 31 are sandwiched between the damper cover 32 and the flywheel 10. When a torque that is equal to or larger than a predetermined value is applied to the torque limiter 30, slippage occurs on surfaces of the linings 31 that are in contact with the damper cover 32 and the flywheel 10. The drive plates 21 and the driven plate 22 are rotatable relative to each other in a circumferential direction thereof. Also, small amounts of radial clearances are provided between a bush 23 disposed between the drive plate 21 and the driven plate 22, and the drive plates 21 and the driven plate 22, respectively, whereby the drive and driven plates 21, 22 rattle in the radial directions. In order to allow or accommodate rattling and assembling errors, a radial clearance d is provided between an outer periphery of the drive plate 21 (or a member secured thereto) and an inner periphery of the flywheel 10.

A procedure of assembling the known torque fluctuation absorbing apparatus 1 is as follows: (1) a hub 22a of the driven plate 22 of the damper assembly 20 and the crankshaft 2 are aligned with an engine assembly by using a jig 50, as shown in FIG. 9, (2) the damper cover 32 is bolted to the flywheel 10, and the damper cover 32 and the flywheel 10 sandwich the linings 31 secured to the drive plate 21 to thereby support the damper assembly 20, and (3) the engine assembly is assembled with a driven-side assembly, and these assemblies are thus fixed to each other.

The known apparatus, however, has following problems.

In the presence of the radial clearance between the drive plate and the driven plate as described above, the drive plate may be disposed ecccentrically within the range of the clearance with respect to the flywheel, even with the driven plate being properly aligned with the engine assembly by using the jig upon assembling of the torque fluctuation absorbing apparatus with the engine assembly. As a result, the linings of the torque limiter secured to the drive plate may be out of alignment with respect to the flywheel in the radial directions. If the torque limiter is assembled eccentrically with the engine assembly, the following and/or other problems may occur when the engine is rotated, after assembling of the engine assembly with the driven-side assembly, to an angular point where the radial clearance between the drive plate and the driven plate disappears. For example, 1) the rotation of the input shaft of the driven-side assembly may become unstable or fluctuating due to the eccentric arrangement of the drive and driven plates, and torsional stress may be applied to a bearing 60 that supports the input shaft of the driven-side assembly, resulting in a reduction in the service life of the bearing 60, 2) the service life of a bushing 61 (or a needle bearing) that is in sliding contact with the driven-side input shaft during rotation thereof may be shortened, and 3) the performance of an oil seal 62 that is in sliding contact with the driven-side input shaft may deteriorate.

SUMMARY OF THE INVENTION

It is an aspect of this invention to provide a structure and a method (an assembling method) for reducing misalignment of a torque limiter during assembling of a torque fluctuation absorbing apparatus.

To accomplish the above and/or other aspects, there is provided according to one aspect of the invention a torque fluctuation absorbing apparatus provided between a crankshaft of an engine and a driven-side input shaft, comprising: (1) a flywheel coupled to the crankshaft, (2) a damper assembly disposed in a torque transmission path between the flywheel and the driven-side input shaft, the damper assembly including a pair of drive plates, a driven plate and at least one spring damper, and (3) a torque limiter disposed in a torque transmission path between the flywheel and the damper assembly, the torque limiter including a pair of linings that are adapted to slip when receiving at least a predetermined amount of torque. In this apparatus, the torque limiter further includes a lining support plate to which the linings are fixed, and the linings are interposed between the pair of the drive plates. In fabricating this apparatus, the drive plates and the linings are centered with each other and assembled into a damper-torque limiter assembly, while the lining support plate is centered with respect to the flywheel, such that the damper-torque limiter assembly is fixed at the lining support plate to the flywheel. With this arrangement, the drive plates, the linings, and the flywheel are brought into concentric relationship with each other, thus effectively preventing the torque limiter from being eccentrically positioned with respect to the engine assembly during assembling of the apparatus.

According to a second aspect of the invention, there is provided a torque fluctuation absorbing apparatus including the flywheel, the damper assembly and the torque limiter as described above, in which the linings of the torque limiter are fixed to one of the drive plates of the damper assembly, and the torque limiter includes a pair of damper covers between which the linings are interposed. In fabricating this apparatus, the drive plates and the damper covers are centered with each other and assembled into a damper-torque limiter assembly, while the damper covers are centered with respect to the flywheel, such that the damper-torque limiter assembly is fixed at the damper covers to the flywheel.

According to a third aspect of the invention, there is provided a torque fluctuation absorbing apparatus including the flywheel, the damper assembly and the torque limiter as described above, in which the linings of the torque limiter are fixed to one of the drive plates, and the linings are interposed between the flywheel and a damper cover that forms a part of the torque limiter, while the flywheel includes a flywheel main body and a flywheel plate that are fastened to each other. In fabricating this apparatus, the drive plates, the linings and the damper cover are centered with respect to the flywheel main body, and are assembled together to provide an assembly of the flywheel main body, the damper assembly and the torque limiter. After the engine is assembled with the drive-side input shaft, the assembly of the flywheel main body, the damper assembly and the torque limiter is fastened to the flywheel plate that is fixed to the crankshaft.

According to a fourth aspect of the invention, there is provided a torque fluctuation absorbing apparatus including the flywheel, the damper assembly and the torque limiter as described above, in which the driven-side input shaft includes an axially protruding portion at a distal end thereof, and the crankshaft has a recess formed in a distal end portion thereof, and a bearing that is fitted in the recess. Furthermore, the axially protruding portion is received in an inner bore of the bearing, and an elastic material is provided between the bearing and the crankshaft or between the bearing and the axially protruding portion.

According to a fifth aspect of the invention, there is provided a torque fluctuation absorbing apparatus including the flywheel, the damper assembly and the torque limiter as described above, and further including a bearing that is fitted in a recess formed in a distal end portion of the crankshaft, and a drive plate support member that supports the drive plates. One end of the drive plate support member is fitted in an inner circumferential wall of the bearing, and the other end of the drive plate support member is fixed to one of the drive plates.

According to a sixth aspect of the invention, there is provided a torque fluctuation absorbing apparatus including the flywheel, the damper assembly and the torque limiter as described above, and further including a bearing that is fitted in a recess formed in a distal end portion of the crankshaft, and a driven plate support member that supports the driven plate. One end of the driven plate support member is fitted in an inner circumferential wall of the bearing, and the other end of the support member is fixed to the driven plate.

According to a seventh aspect of the invention, there is provided a method of assembling a torque fluctuation absorbing apparatus including the flywheel, the damper assembly, and the torque limiter as described above, which method includes steps of (1) temporarily centering the drive plates to which the linings are fixed and the driven plate with each other (by using a pin), and (2) centering the damper assembly in which the drive plates and the driven plate are centered with each other, with respect to the flywheel, (by using a jig), and fixing the damper assembly to the flywheel via a damper cover that forms a part of the torque limiter.

According to an eighth aspect of the invention, there is provided a method of assembling a torque fluctuation absorbing apparatus including the flywheel, the damper assembly, and the torque limiter as described above, which method includes steps of (1) centering the drive plates to which the linings are fixed, with respect to the flywheel(, by using a jig), and (2) fixing the damper assembly that is centered with respect to the flywheel, to the flywheel, by a damper cover that forms a part of the torque limiter.

According to a ninth aspect of the invention, there is provided a method of assembling a torque fluctuation absorbing apparatus including the flywheel, the damper assembly, and the torque limiter as described above, which method includes steps of (1) engaging the engine with the driven-side input shaft, and (2) then forcing the torque fluctuation absorbing apparatus to resonate under control, so as to cause the torque limiter to slip, thereby reducing misalignment of the torque limiter during assembling of the torque fluctuation absorbing apparatus.

According to a tenth aspect of the invention, there is provided a method of assembling a torque fluctuation absorbing apparatus including the flywheel, the damper assembly, and the torque limiter as described above, which method includes steps of: (1) engaging the engine with the driven-side input shaft, and (2) then temporarily reducing an amount of torque that is required for causing slippage of the torque limiter, so as to permit the torque limiter to slip, thereby reducing misalignment of the torque limiter during assembling of the torque fluctuation absorbing apparatus.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein.

DETAILED DESCRIPTION

Figure 8:
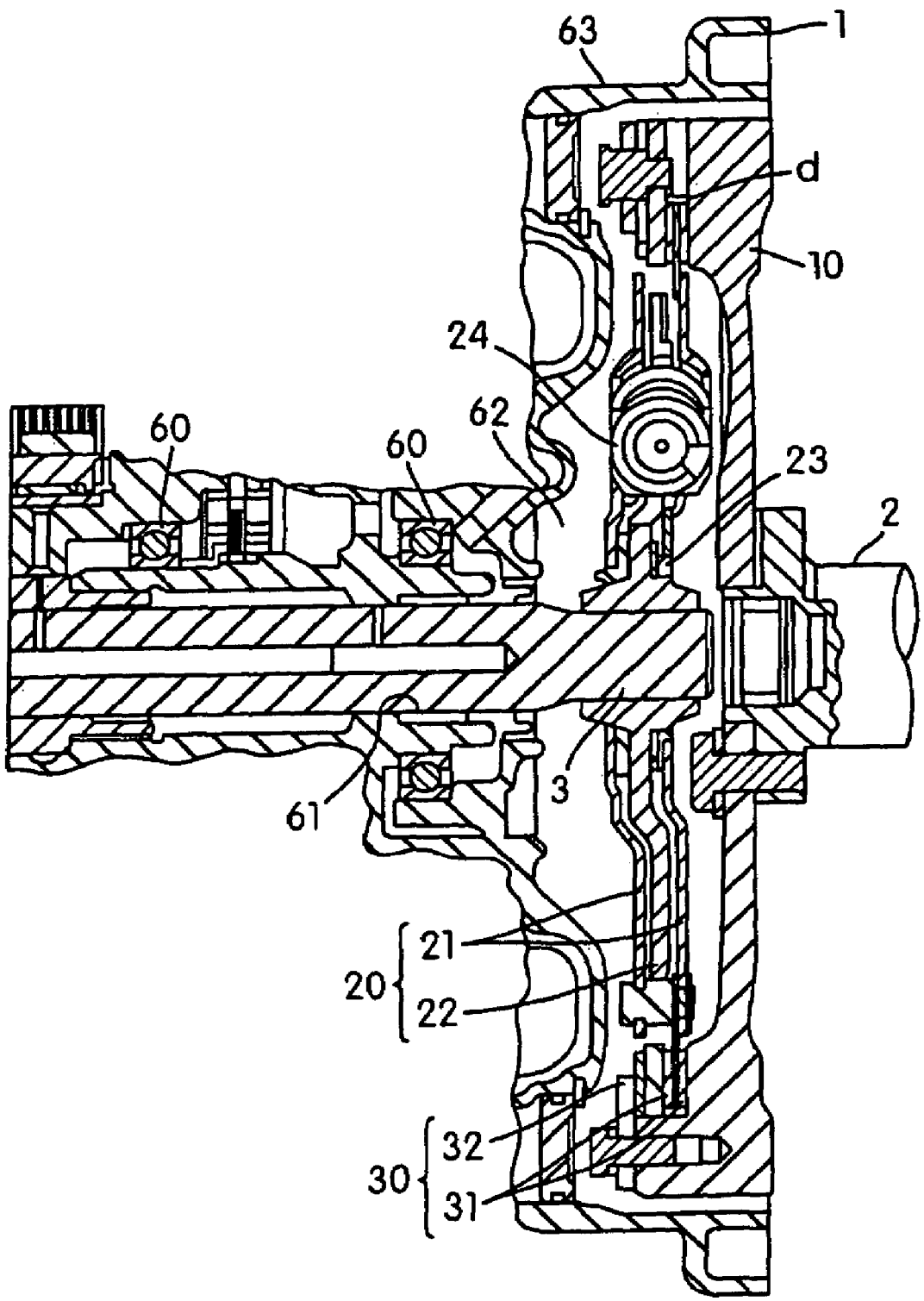
FIG. 8 is a cross-sectional view showing a known example of torque fluctuation absorbing apparatus.
Figure 9:
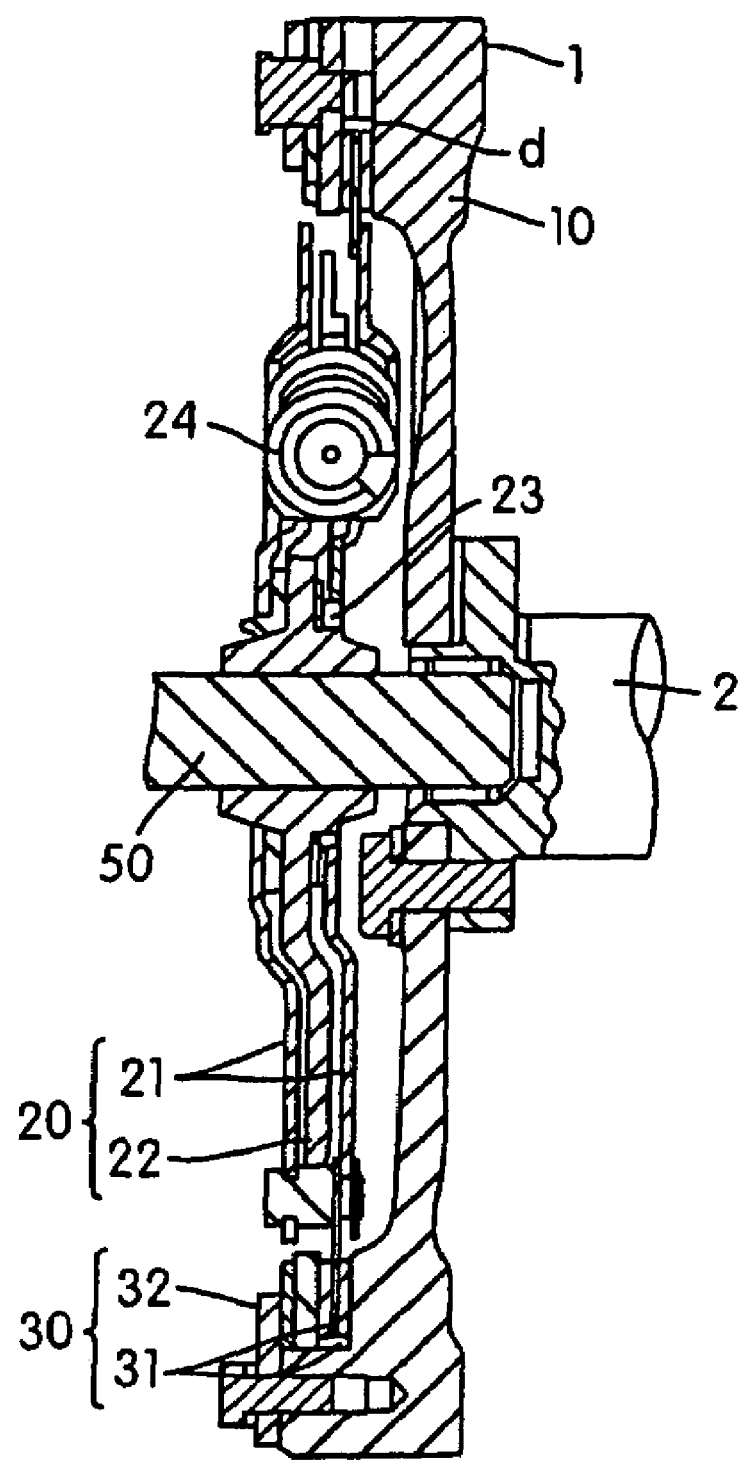
FIG. 9 is a cross-sectional view showing, by way of example, a method of assembling the known torque fluctuation absorbing apparatus of FIG. 8.

Referring to FIG. 1 through FIG. 7, there will be described a structure and a method for reducing or preventing misalignment of a torque limiter during assembling of a torque fluctuation absorbing apparatus according to preferred embodiments of the invention. In FIG. 1 through FIG. 7, the same or similar elements or portions that are common to all of the embodiments are denoted by the same reference numerals. Likewise, the same reference numerals as used in FIG. 8 and FIG. 9 showing the known arrangement are used to identify structurally corresponding elements or portions in FIG. 1 through FIG. 7.

The structure and specific elements or portions that are common to all of the embodiments of the invention will be first explained with reference to, for example, FIG. 1 through FIG. 7.

The torque fluctuation absorbing apparatus is adapted to transmit torque from an engine crankshaft 2 to a driven-side input shaft 3. The apparatus 101 includes a flywheel 10 that is coupled to the engine crankshaft 2, and a driven plate 22 having a hub portion 22a that is in splined engagement with the driven-side input shaft 3.

The driven-side assembly may be, for example, a transmission (T/M) of a hybrid vehicle that is driven with an engine and an electric motor. As shown in FIG. 8, the transmission (T/M) includes the input shaft 3, an electric motor coupled through a planetary gear set to the input shaft 3, a charging generator, bearings 60 that rotatably support the input shaft 3, a bush 61 (or a needle bearing), a T/M casing 63, an oil seal 62 that seals the input shaft 3 and the T/M casing 63, and other components.

The torque fluctuation absorbing apparatus 101, to which the method or structure for reducing misalignment of the torque limiter according to the invention is applied, includes a flywheel 10 that is coupled to the engine crankshaft 2, a damper assembly 20 disposed in a torque transmission path between the flywheel 10 and the driven-side input shaft 3, and a torque limiter 30 disposed in a torque transmission path between the flywheel 10 and the damper assembly 20. The damper assembly 20 has a pair of drive plates 21, a driven plate 22, and spring dampers 24. The torque limiter 30 has a pair of lining portions 31 (or at least one lining portion 31), and gives rise to slippage when receiving torque of a predetermined value or larger.

Figure 3:
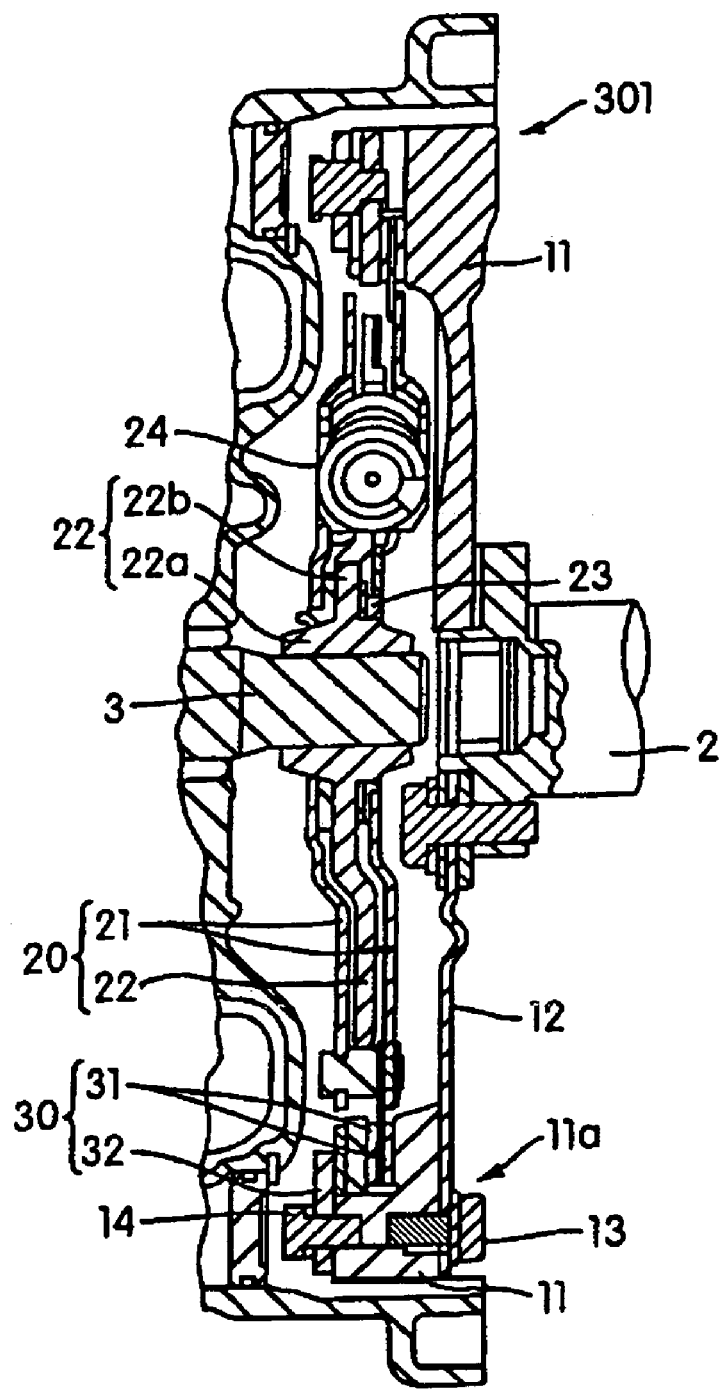
FIG. 3 is a cross-sectional view showing a torque fluctuation absorbing apparatus having a structure for reducing misalignment of a torque limiter upon mounting thereof according to a third embodiment of the invention.

The flywheel 10 may be formed as an integral body, or may be a structure in which a flywheel main body 11 is fastened to a flywheel plate 12 with a bolt 13, as shown in FIG. 3. The flywheel 10 functions as a mass in a vibration system.

In the damper assembly 20, the pair of drive plates 21 and the driven plate 22 are rotatable relative to each other. For example, the pair of drive plates 21 have a plurality of windows that extend in the circumferential direction, and the spring damper 24 is disposed and supported in each of these windows. The driven plate 22 has a hub 22a and arms 22b that extend radially outward from the hub 22a, and each of the arms 22b extends between adjacent spring dampers 24.

Figure 1:
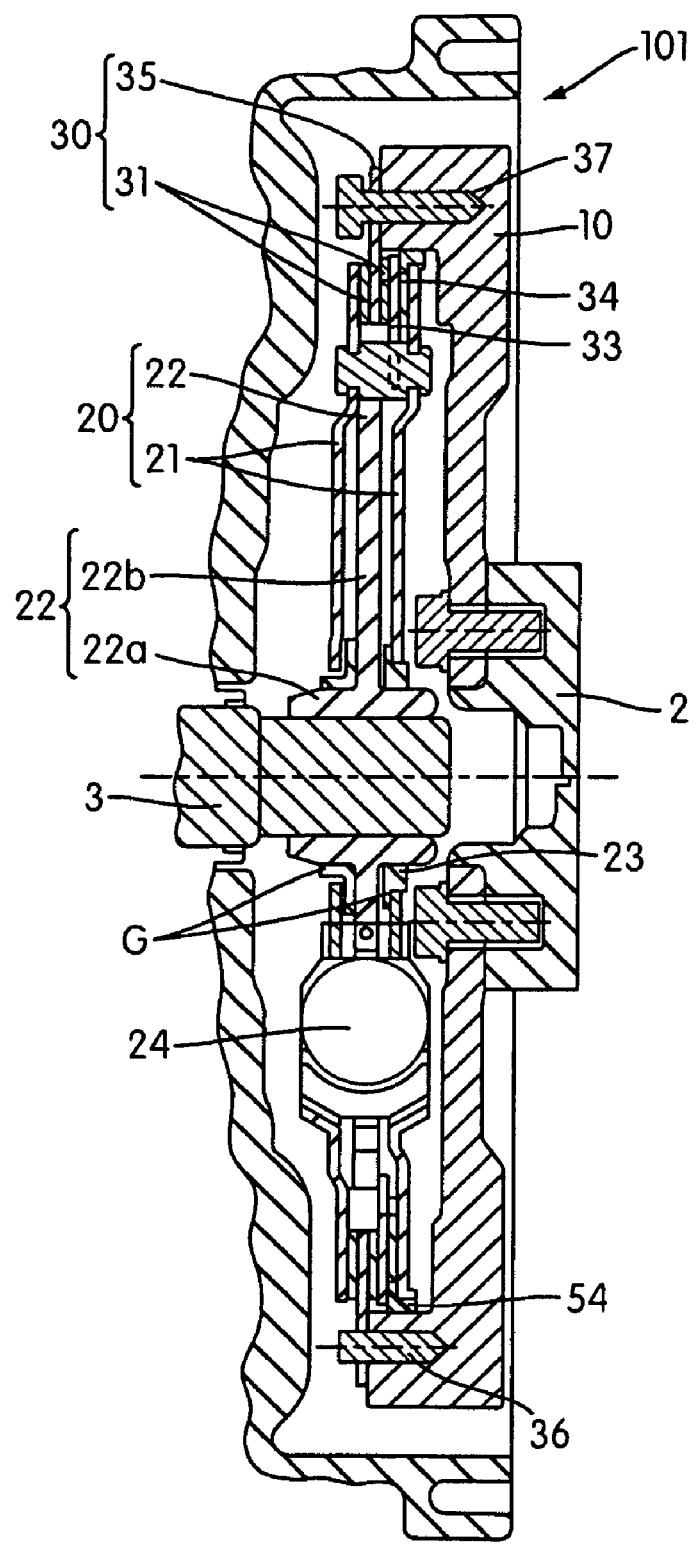
FIG. 1 is a cross-sectional view showing a torque fluctuation absorbing apparatus having a structure for reducing misalignment of a torque limiter upon mounting thereof according to a first embodiment of the invention.

When the drive plates 21 rotate relative to the driven plate 22 so that the arms 22b are pressed against the corresponding spring dampers 24, one end of each spring damper 24 is spaced from a corresponding edge of the window, and the spring damper 24 is flexed or contracted. Thus, the spring dampers 24 function as a spring in a vibration system. As shown in FIG. 1, for example, a bush 23 is disposed between the hub 22a of the driven plate 22 and the drive plates 21, and very small or slight clearances G are formed between the bush 23 and the hub arm 22b and between the bush 23 and the drive plate 21 to permit rotation. Conventionally, these clearances have caused misalignment of the torque limiter 30 upon assembling of the torque fluctuation absorbing apparatus 101 with the engine.

The torque limiter 30 has the pair of lining portions 31 (or at least one lining portion 31), a damper cover 32 that holds or retains the lining portion 31, a holding plate 33, and a coned disc spring 34. The coned disc spring 34 provides a predetermined thrust force to obtain a predetermined amount of torque. When the torque equal to or larger than the predetermined amount is applied to the torque limiter 30, the linings 31 slip against their opposed members, thus preventing the predetermined or larger torque from being transmitted to the driven side.

Next, the structure and method for reducing misalignment of the torque limiter according to each embodiment of the invention, and their effects, will be described in detail.

In the first embodiment of the invention as shown in FIG. 1, the linings 31 of the torque limiter 30 are separated from (i.e., are not fixed to) the drive plate 21 of the damper, and the torque limiter 30 is provided with a lining support plate 35 to which the linings 31 are fixed, while the linings 31 are interposed between a pair of drive plates 21. The linings 31 are secured to both surfaces of the lining support plate 35, which is located between the pair of drive plates 21. With the lining support plate 35 located in position, the linings 31 are sandwiched between one of the drive plates 21 and a holding plate 33 that is supported via a coned disc spring 34 by the other drive plate 21. A bush 54 is provided in a radial clearance between the drive plates 21 and the flywheel 10, so as to support these members. With this arrangement, misalignment between the flywheel 10 and the drive plates 21 can be reduced, and misalignment between the flywheel 10 and the linings 31 of the torque limiter 30 can also be reduced since the linings 31 are centered via the drive plates 21 with respect to the flywheel 10. The bush 54 has an annular shape, and is formed of, for example, a resin material. The bush 54 is press-fitted into or bonded to any one of the drive plate 21, or the flywheel 10.

A procedure of assembling the above-described structure is as follows. The drive plates 21 and the linings 31 secured to the lining support plate 35 are centered with each other and assembled together to provide a damper-torque limiter assembly. Then, the lining support plate 35 is centered by a pin 36 and fixed by a bolt 37 to the flywheel 10 so that the damper-torque limiter assembly is fixed at the lining support plate 35 to the flywheel 10.

As described above, the linings 31 are separated from the drive plates 21 and are interposed between these plates 21, and the damper-torque limiter assembly formed by centering and assembling the drive plates 21 and the linings 31 together is fixed to the flywheel 10. With this arrangement, the drive plates 21, the linings 31, and the flywheel 10 are brought into concentric relationship with each other, thus effectively preventing the torque limiter 30 from being eccentrically positioned with respect to the engine assembly during assembling of the torque fluctuation absorbing apparatus. In the meantime, a driven plate 22 is automatically positioned by the driven-side assembly 3 when the engine assembly is assembled or combined with the driven-side assembly.

Figure 2:
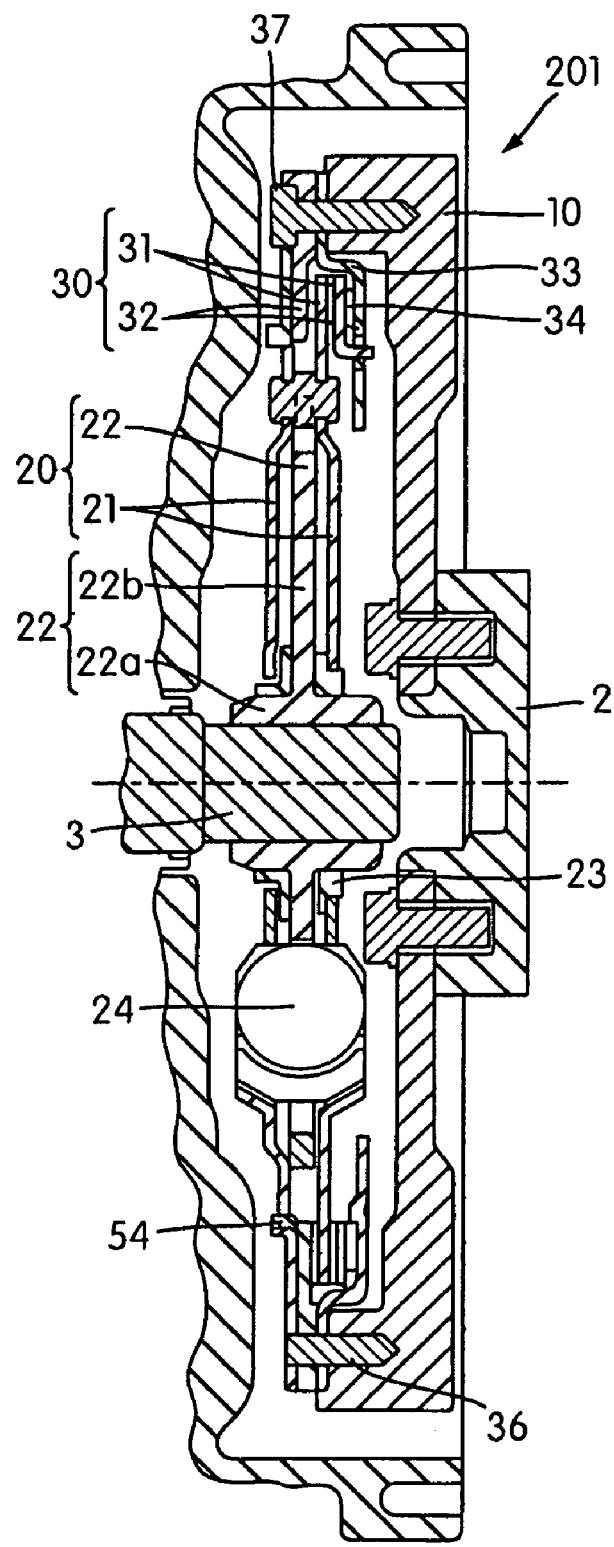
FIG. 2 is a cross-sectional view showing a torque fluctuation absorbing apparatus having a structure for reducing misalignment of a torque limiter upon mounting thereof according to a second embodiment of the invention.

In the second embodiment of the invention as shown in FIG. 2, the linings 31 of the torque limiter 30 are secured to one of the drive plates 21 of the damper, and the torque limiter 30 is provided with a pair of damper covers 32 between which the linings 31 are interposed. The linings 31 secured to the drive plate 21 are sandwiched between one of the damper covers 32 and a holding plate 33 provided via a coned disc spring 34 on the inner side of the other damper cover 32. A bush 54 is provided in a radial clearance between one of the drive plates 21 and the flywheel 10 or between the drive plate 21 and the damper cover 32 so as to support both members. With this arrangement, misalignment between the flywheel 10 and the drive plates 21 can be reduced, and misalignment of the linings 31 of the torque limiter 30 can also be reduced since the linings 31 are centered via the drive plates 21 to the flywheel 10. The bush 54 has an annular shape, and is formed of, for example, a resin material. The bush 54 is press-fitted into or bonded to any one of the drive plate 21, the damper cover 32, or the flywheel 10.

A procedure of assembling the above-described structure is as follows. The drive plates 21 and the damper covers 32 are centered and assembled together to provide a damper-torque limiter assembly. The damper covers 32 are centered by means of a pin 36 and are fixed by a bolt 37 to the flywheel 10, so that the damper-torque limiter assembly is fixed at the damper covers 32 to the flywheel 10.

As described above, the linings 31 are secured to one of the drive plates 21 and are interposed between the damper covers 32, and the damper-torque limiter assembly formed by centering and assembling the drive plates 21 and the damper covers 32 together is fixed to the flywheel 10. With this arrangement, the drive plates 21, the linings 31, and the flywheel 10 are brought into concentric relationship with each other, thus effectively preventing the torque limiter 30 from being eccentrically positioned with respect to the engine assembly during assembling of the torque fluctuation absorbing apparatus 201.

In the third embodiment of the invention as shown in FIG. 3, the linings 31 of the torque limiter 30 are secured to one of the drive plates 21, and are sandwiched between the flywheel 11a and the damper cover 32 that forms a part of the torque limiter 30. The flywheel 11a has a flywheel main body 11 and a flywheel plate 12 that are fastened by a bolt to each other.

A procedure of assembling the above-described structure is as follows. The drive plates 21, linings 31, and the damper cover 32 are centered with respect to and assembled with the flywheel main body 11 to provide an assembly of the flywheel main body, the damper assembly and the torque limiter. The engine is then assembled with and is fixed to the driven-side structure. Thereafter, the assembly of the flywheel main body, the damper assembly and the torque limiter is fastened by a bolt 13 to the flywheel plate 12 that is fixed to the crankshaft 2. The bolt 13 is passed through a hole formed through a casing of the engine assembly, to reach the flywheel plate 12 for fastening. The bolt 13 is different from a bolt 14 used to fasten the damper cover 32 to the flywheel main body 11.

As described above, the flywheel 11a is constructed such that the flywheel main body 11 is bolted to the flywheel plate 12. Furthermore, the drive plates 21 and the linings 31 are centered with respect to and assembled with the flywheel main body 11, and the resulting structure, i.e., the flywheel main body 11 with the damper assembly and the torque limiter, is fastened by the bolt 13 to the flywheel plate 12. With this arrangement, the drive plates 21, the linings 31, and the flywheel 10 are brought into concentric relationship with each other, thus effectively preventing the torque limiter 30 from being eccentrically positioned during assembling of the torque fluctuation absorbing apparatus 301.

Figure 4:
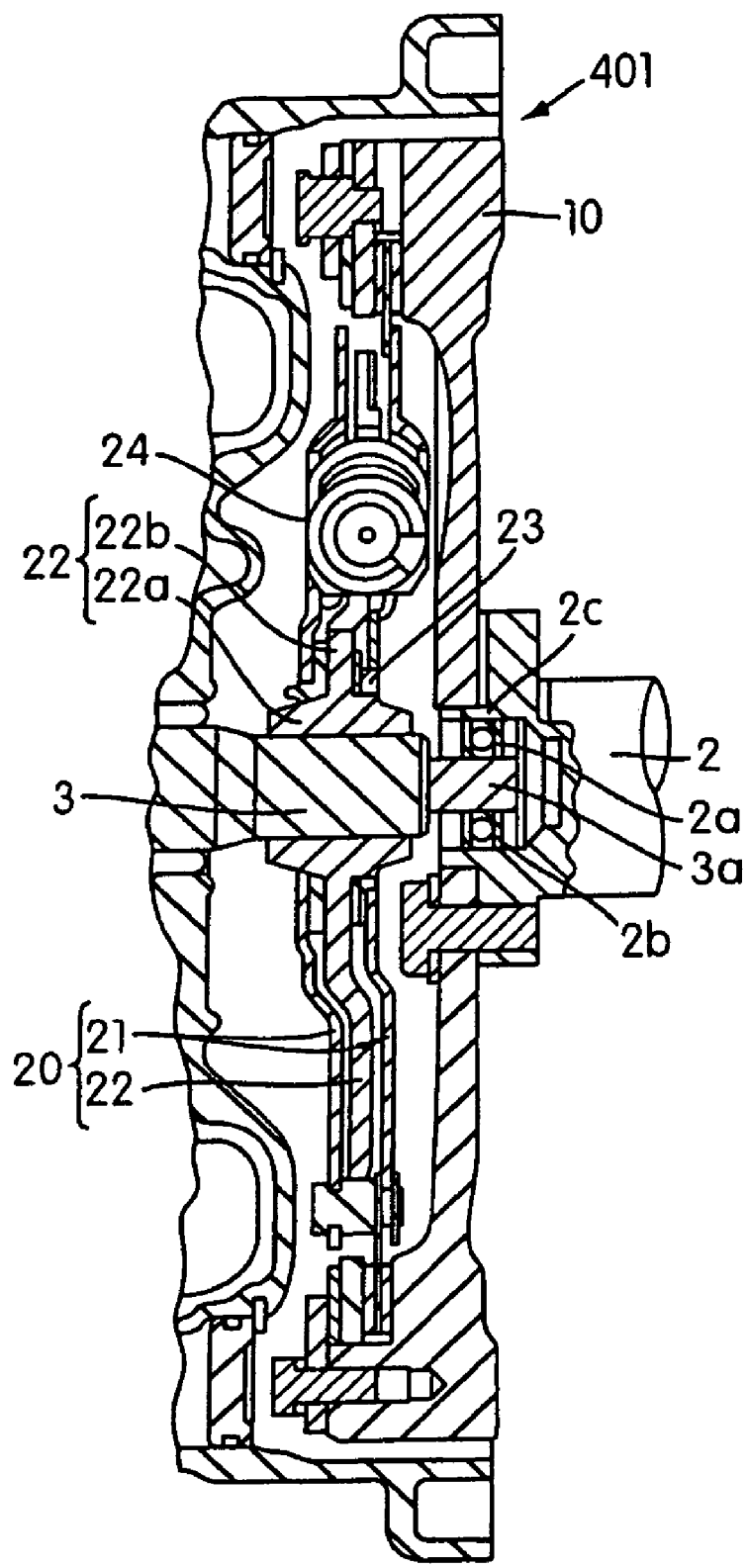
FIG. 4 is a cross-sectional view showing a torque fluctuation absorbing apparatus having a structure for reducing misalignment of a torque limiter upon mounting thereof according to a fourth embodiment of the invention.

In the fourth embodiment of the invention as shown in FIG. 4, an axially protruding portion 3a is provided at the distal end of the driven-side input shaft 3, while a bearing 2b is fitted in a recess 2a formed in a distal end portion of the crankshaft 2. The axially protruding portion 3a protrudes into an inner bore of the bearing 2b with an elastic material 2c provided between the bearing 2b and the crankshaft 2 or between the bearing 2b and the axially protruding portion 3a.

Since the axially protruding portion 3a of the driven-side input shaft 3 is fitted in the inner bore of the bearing 2b within the recess 2a formed in the distal end portion of the crankshaft 2, a torsional load applied to the driven-side input shaft 3 due to misalignment of the torque limiter 30 with respect to the axis of the flywheel during assembling thereof can be received by not only the support bearing 60 (FIG. 8) of the driven-side input shaft 3, but also by the bearing 2b in the recess 2a formed in the distal end portion of the crankshaft 2. With this arrangement, the load can be distributed to the bearings 60 and 2b, and the torsional stress applied to the support bearing 60 of the driven-side input shaft 3 can be thus reduced, resulting in an increase in the service life of the bearing 60. In addition, the elastic material 2c is provided between the bearing 2b and the crankshaft 2 or the axially protruding portion 3a in order to prevent an excessive load from being applied between the axially protruding portion 3a of the driven-side input shaft 3 and the crankshaft 2 due to misalignment of these shafts.

Figure 5:
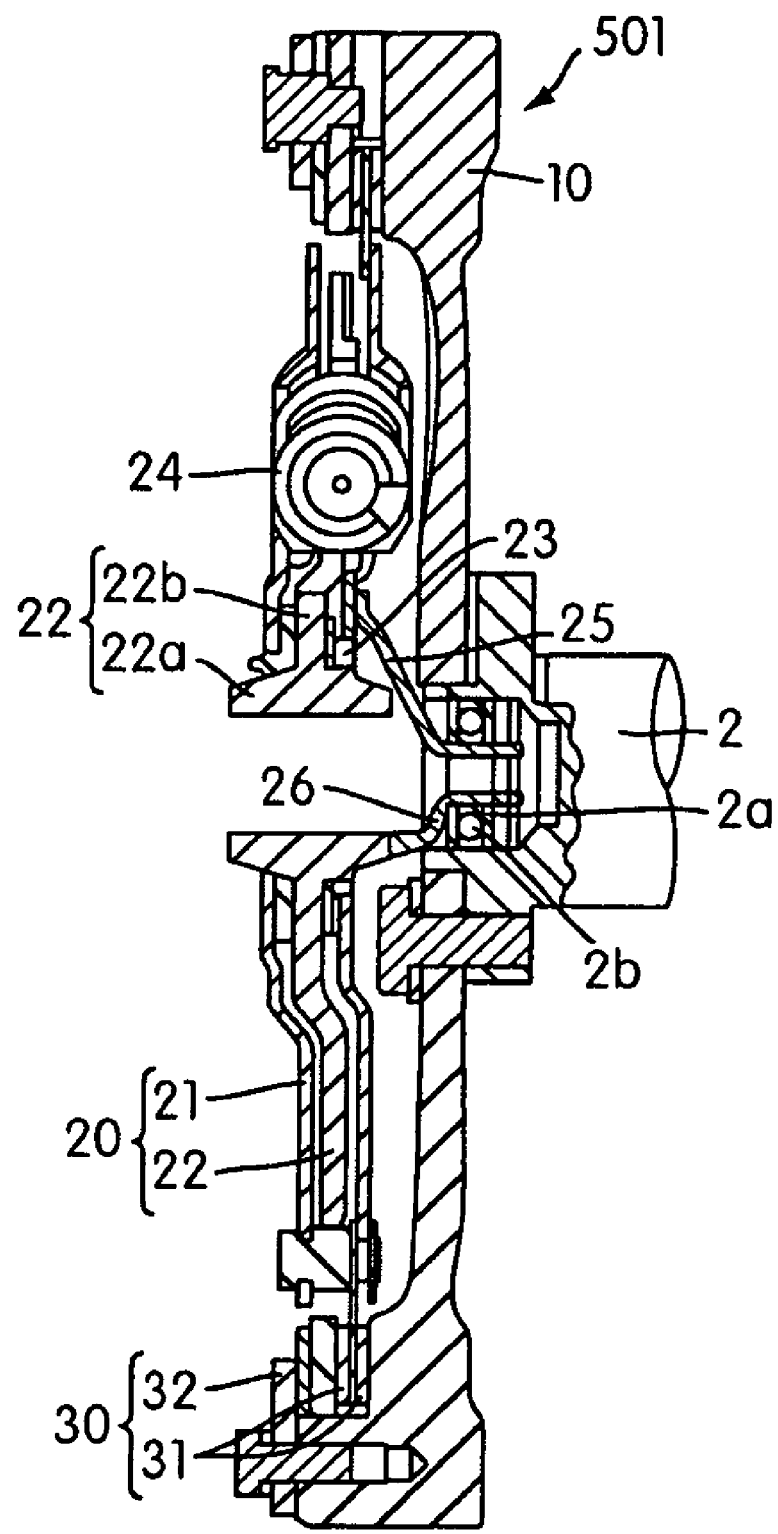
FIG. 5 is a cross-sectional view showing a torque fluctuation absorbing apparatus that is assembled by a method for reducing misalignment of a torque limiter upon mounting thereof in the apparatus according to a fifth embodiment of the invention.

In the fifth embodiment of the invention as shown in the upper half of FIG. 5, a bearing 2b is received in a recess 2a formed in a distal end portion of the crankshaft 2, and the drive plates 21 are supported by a drive plate support member 25 having one end fitted in the inner circumferential wall of the bearing 2b and the other end welded or otherwise secured to one of the drive plates 21. The drive plate support member 25 has a generally conical shape, and extends radially outwards from the inner wall of the bearing 2b.

With the arrangement as described above, since the crankshaft 2 supports the drive plates 21 to which the linings 31 are secured, the drive plates 21 and the linings 31 are disposed concentrically with the crankshaft 2 and the flywheel 10, thus preventing the torque limiter 30 from being eccentrically positioned or misaligned with respect to the engine assembly during assembling of the torque fluctuation absorbing apparatus 501.

In the sixth embodiment of the invention as shown in the lower half of FIG. 5, a bearing 2b is received in a recess 2a formed in a distal end portion of the crankshaft 2, and the driven plate 22 is supported by a driven plate support member 25 having one end fitted in the inner circumferential wall of the bearing 2b and the other end welded or otherwise secured to the driven plate 22. The driven plate support member 25 has a generally conical shape, and extends radially outwards from the inner wall of the bearing 2b.

With the arrangement as described above, since the crankshaft 2 supports the driven plate 22, a torsional load that would occur to the driven-side input shaft 3 due to misalignment of the torque limiter 30 during assembling can be received not only by the support bearing 60 of the driven-side input shaft 3, but also by the bearing 2b in the recess 2a of the crankshaft 2. With this arrangement, the load can be distributed to the bearings 60 and 2b, and the torsional stress applied to the support bearing 60 of the driven-side input shaft 3 can be thus reduced, resulting in an increase in the service life of the bearing 7.

The following methods for reducing misalignment of the torque limiter 30 upon assembling of the torque fluctuation absorbing apparatus according to the seventh through tenth embodiments of the invention are applied to a torque fluctuation absorbing apparatus including (a) a flywheel 10 coupled to a crankshaft 2 of the engine; (b) a damper assembly 20 disposed in a torque transmission path between the flywheel 10 and a driven-side input shaft 3, which assembly includes a pair of drive plates 21, a driven plate 22, and spring dampers 23; and (c) a torque limiter 30 that has a pair of linings 31 and is disposed in a torque transmission path between the flywheel 10 and the damper assembly 20. The torque limiter 30 is adapted to slip against its opposed component(s) when receiving a predetermined or larger amount of torque.

Referring to FIG. 5, there will be described a method for reducing misalignment of the torque limiter during assembling of the torque fluctuation absorbing apparatus according to the seventh embodiment of the invention. In this method, the drive plates 21 to which the linings 31 are secured and the driven plate 22 are temporarily centered or aligned with each other by using a pin 51 (which will be removed after assembling), and the damper assembly 20 in which the drive plates 21 and the driven plate 22 are centered with each other is centered with respect to the crankshaft 2 and the flywheel 10 by using a jig 52. Then, the damper assembly 20 is fixed to the flywheel 10 by using a damper cover 32 that forms a part of the torque limiter 30.

As described above, the drive plates 21 to which the linings 31 are secured and the driven plate 22 are temporarily centered with each other by using the pin 51, and the damper assembly 20 is then centered with the flywheel 10 by using the jig 52 and is fixed to the flywheel 10 by means of the damper cover 32. With this arrangement, the drive plates 21 and the linings 31 are brought into concentric relationship with the crankshaft 2 and the flywheel 10, thus preventing misalignment of the torque limiter 30 during assembling of the torque fluctuation absorbing apparatus 601.

Figure 6:
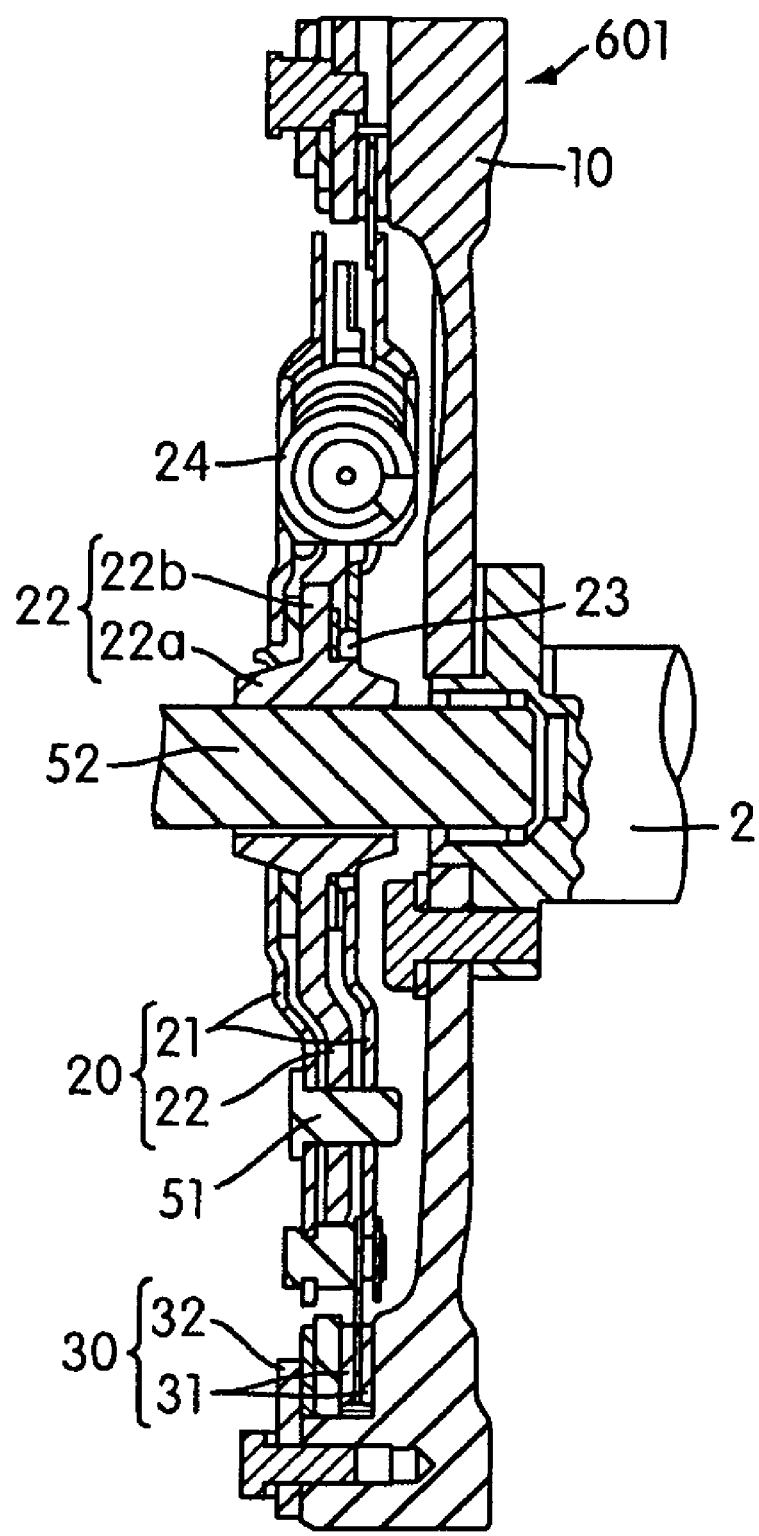
FIG. 6 is a cross-sectional view showing a torque fluctuation absorbing apparatus that is assembled by a method for reducing misalignment of a torque limiter upon mounting thereof according to an sixth embodiment of the invention.
Figure 7:
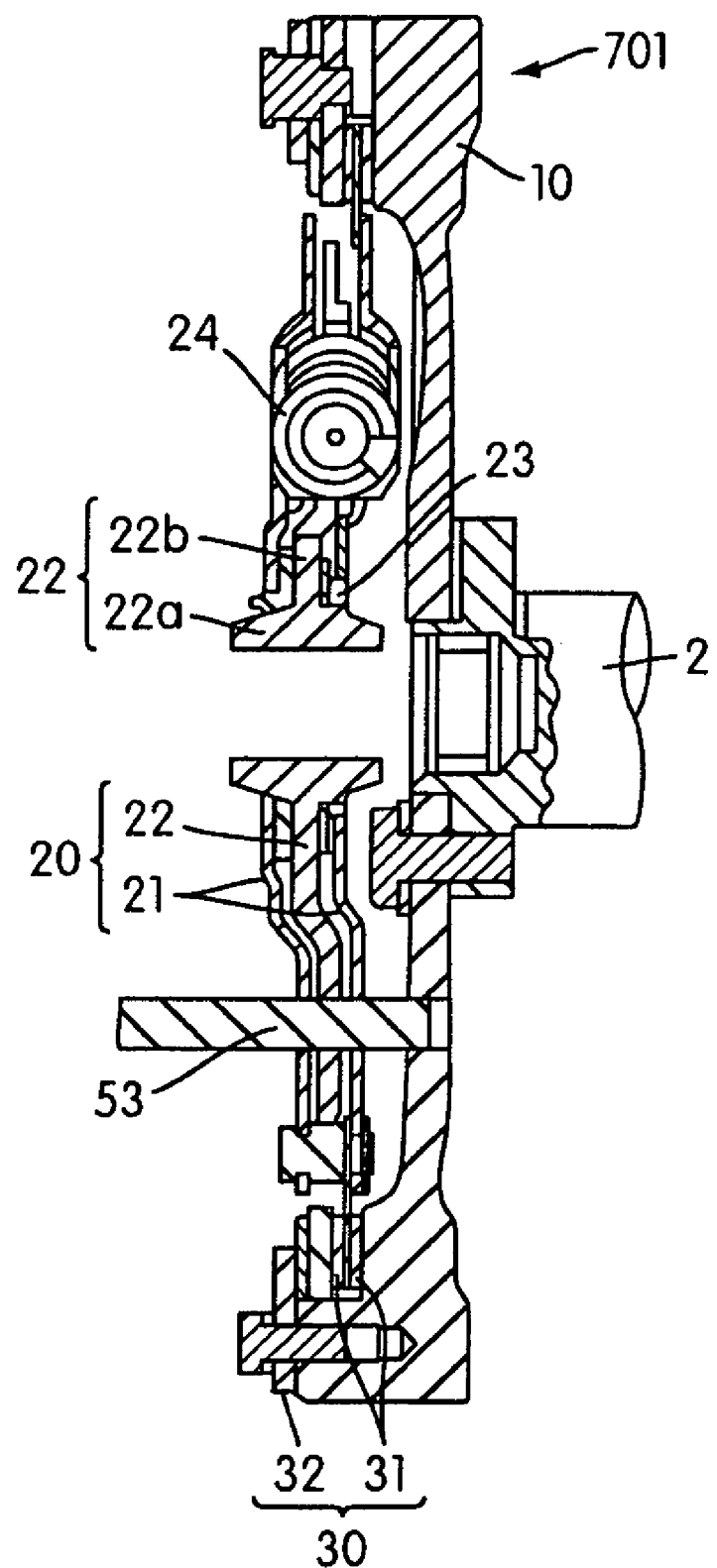
FIG. 7 is a front elevational view showing a torque fluctuation absorbing apparatus to which any of the above embodiments of this invention may be applied.

Referring to FIG. 6, there will be described a method for reducing misalignment of the torque limiter during assembling of the torque fluctuation absorbing apparatus according to the eighth embodiment of the invention. In this method, the drive plates 21 to which the linings 31 are secured are centered with respect to the flywheel 10 by using a jig 53, and the damper assembly 20 that includes the drive plates 21 and is centered with respect to the flywheel 10 is fixed to the flywheel 10 by using a damper cover 32 that forms a part of the torque limiter 30.

As described above, the drive plates 21 to which the linings 31 are secured are temporarily centered with respect to the flywheel 10 by using the jig 53, and the damper assembly 20 is then fixed to the flywheel 10 by means of the damper cover 32. With this arrangement, the linings 31 are disposed concentrically with the crankshaft 2 and the flywheel 10, thus preventing misalignment of the torque limiter 30 during assembling of the torque fluctuation absorbing apparatus 701.

In a method for reducing misalignment of the torque limiter during assembling of the torque fluctuation absorbing apparatus according to the ninth embodiment of the invention, after the engine assembly is combined or assembled with the driven-side structure, the torque fluctuation absorbing apparatus 1 is forced under control to resonate, so that slippage occurs in the torque limiter 30. While the linings 31 of the torque limiter 30 are slipping against their opposed components, the drive plates 21 provided with the linings 31 move in such a direction as to reduce misalignment of the linings 31. Thus, the torque limiter 30 is automatically centered with respect to the engine assembly even if misalignment occurs in the torque limiter 30 upon mounting thereof.

In a method for reducing misalignment of the torque limiter during assembling of the torque fluctuation absorbing apparatus according to the tenth embodiment of the invention, after the engine assembly is combined or assembled with the driven-side assembly, the torque required to cause slippage of the torque limiter 30 is temporarily reduced so that slippage occurs in the torque limiter 30, for example, by controlling ON/OFF of a clutch, or the like, that is added to the apparatus. While the linings 31 of the torque limiter 30 are slipping against their opposed components, the drive plates 21 with the linings 31 move in such a direction as to reduce misalignment of the linings 31. Thus, the torque limiter 30 is automatically centered with respect to the engine assembly even if misalignment occurs in the torque limiter 30 upon mounting thereof. After slipping, the torque required to cause slippage of the torque limiter 30 is returned to its original value.

While the invention has been described with reference to embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A torque fluctuation absorbing apparatus provided between a crankshaft of an engine and a driven-side input shaft, comprising:

a flywheel coupled to the crankshaft;

a damper assembly disposed in a torque transmission path between the flywheel and the driven-side input shaft, the damper assembly including a pair of drive plates, a driven plate and at least one spring damper; and a torque limiter disposed in a torque transmission path between the flywheel and the damper assembly, the torque limiter including a pair of linings which generates relative rotational slip between the flywheel and the damper assembly when a torque larger than a predetermined amount is transmitted, wherein the linings of the torque limiter are fixed to one of the drive plates, and the linings are interposed between the flywheel and a damper cover that forms a part of the torque limiter, while the flywheel includes a flywheel main body and a flywheel plate that are fastened to each other, the drive plates, the linings and the damper cover are centered with respect to the flywheel main body, and are assembled together to provide an assembly of the flywheel main body, the damper assembly and the torque limiter, after the engine is assembled with the drive-side input shaft, the assembly of the flywheel main body, the damper assembly and the torque limiter is fastened by bolting to the flywheel plate that is fixed to the crankshaft.

* * * * *